United States Patent [19]

Lederman

[11] Patent Number: 4,635,778
[45] Date of Patent: Jan. 13, 1987

[54] FLUID-OPERATED PISTON

[75] Inventor: Frederick E. Lederman, Sandusky, Ohio

[73] Assignee: General Motors Corporation, Detroit, Mich.

[21] Appl. No.: 808,607

[22] Filed: Dec. 13, 1985

[51] Int. Cl.⁴ .......................................... A16D 19/00
[52] U.S. Cl. ............................. 192/85 AA; 192/18 A; 92/183
[58] Field of Search ........... 192/85 AA, 18 A, 109 A, 192/85 A, 88 A; 92/84, 181 P, 183, 247

[56] References Cited

U.S. PATENT DOCUMENTS

| | | | |
|---|---|---|---|
| 3,605,409 | 9/1971 | Heese et al. | 92/183 X |
| 3,814,226 | 6/1974 | White | 192/85 AA |
| 4,450,943 | 5/1984 | Long, Jr. | 192/85 AA X |
| 4,529,073 | 7/1985 | Lewis | 192/85 AA X |
| 4,574,926 | 3/1986 | Bubak | 192/85 AA X |

*Primary Examiner*—Carl D. Friedman
*Attorney, Agent, or Firm*—D. F. Scherer

[57] ABSTRACT

A fluid-operated friction engaged torque transmitting device, such as a clutch or brake, has a piston member. The piston has a rigid material, such as metal or plastic body member which is encased in an elastomeric cover. The elastomeric cover is a molded structure which is bonded to the rigid body. The elastomeric cover has integrally formed therewith, during molding, a pair of annular lip seals, a valve structure and a spring portion. A reaction plate or ring is molded or bonded to the spring portion.

2 Claims, 3 Drawing Figures

FLUID-OPERATED PISTON

BACKGROUND OF THE INVENTION

This invention relates to fluid-operated devices, and more particularly to piston assemblies used in said devices.

There are known piston structures which include an elastomeric cover. However, these devices do not include integral lip seals, reaction plate and spring members. Also, the known prior art does not have an integrally molded valve arrangement that can provide an air bleed in a brake or an air bleed and a centrifugal control in a clutch.

SUMMARY OF THE INVENTION

It is therefore an object of this invention to provide an improved fluid-operated friction torque transmitter having a piston with a rigid body and an elastomeric covering molded thereto and wherein the elastomeric covering includes integrally therewith a pair of annular lip seals, a valve member and a spring.

It is a further object of this invention to provide an improved fluid-operated friction torque transmitter having a piston with a rigid body and an elastomeric covering molded thereto and wherein the elastomeric covering includes integrally therewith a pair of annular lip seals, a valve member and an annular spring; said piston further including a reaction ring integrally molded to the spring.

DESCRIPTION OF THE PREFERRED EMBODIMENT

Figures 1, 2, 3:
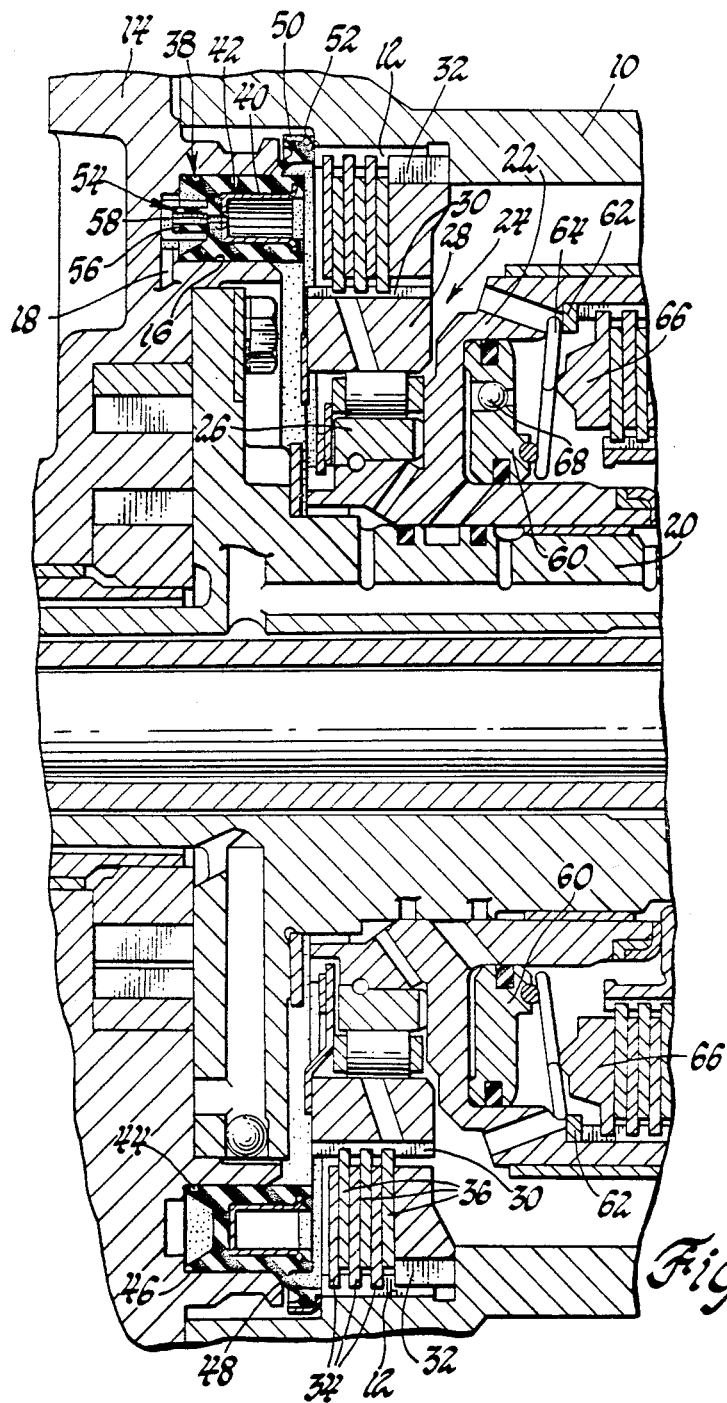
FIG. 1 is a cross-sectional elevational view of a friction torque transmitting device incorporating the present invention.
FIG. 2 is an enlarged cross-sectional view of a portion of the piston shown in FIG. 1.
FIG. 3 is a view taken along line 3—3 of FIG. 2.

Referring to the drawings, wherein like characters represent the same or corresponding parts throughout the several views, there is seen in FIG. 1 a section of a transmission including a housing 10 having a splined portion 12 formed therein. The housing 10 is closed at the left end by an end cover or pump housing 14 in which is formed an annular cavity 16. The cavity 16 has communicated therewith a hydraulic passage 18. The cover 14 has secured thereto a support sleeve 20 on which is rotatably mounted a clutch housing 22. The clutch housing 22 has operatively connected therewith a one-way device 24 including an inner race 26 and an outer race 28. The outer race 28 has a splined periphery 30. The spline 12 has meshing therewith a brake backing plate 32 and a plurality of friction plates 34. The splined periphery 30 has meshing therewith a plurality of friction plates 36 which are alternately spaced with the friction plates 34.

The annular cavity 16 has slidably disposed therein a piston assembly 38 which is responsive to fluid pressure admitted to the cavity 16 through passage 18 to controllably engage and disengage the friction plates 34 and 36, such that a torque transmitting connection is established between the outer race 28 and the transmission housing 10.

As best seen in FIGS. 1 and 2, the piston assembly 38 includes an annular piston body 40 which is formed from a rigid material such as metal or hard plastic. The body 40 is covered by an elastomeric cover portion 42 which is preferably bonded to the piston body 40. The cover portion 42 has integrally molded therewith a pair of annular lip seals 44 and 46 adapted to slidably engage and fluidly seal with the outer and inner annular walls of cavity 16. The cooperation of these annular lip seals with cavity 16 prevents fluid leakage from the cavity 16 toward the friction plates 34 and 36.

The elastomeric covering 42 also has an annular spring portion 48 integrally molded therewith and extending annularly about the main portion of the elastomeric cover. The spring portion 48 has integrally bonded thereto a reaction ring 50 which is adapted to abut an annular shoulder 52 formed in the transmission housing 10. When the pressure in cavity 16 is reduced, the spring portion 48 is effective to move the piston assembly 38 leftward in the cavity 16 such that disengagement of the friction plates 34 and 36 will occur.

A valve 54 is molded integrally with the elastomeric cover 42. The valve 54 which, as seen in FIGS. 2 and 3, includes a hexagonal or oval shaped wall 56 surrounding three fluid passages 58 which are effective to communicate fluid between cavity 16 and the area of the friction plates 34 which is, of course, a low pressure or exhaust area. The hexagonal wall 56 is designed to collapse inwardly at a predetermined pressure such that the passages 58 will be closed from the cavity 16 thereby sealing the cavity 16 from fluid exhaust. Thus, when a sufficiently high apply pressure is admitted to the cavity 16, the valve 54 will close and the piston 38 will be moved rightward against the annular spring 48 to enforce engagement between the friction plates 34 and 36 thereby engaging the torque transmitting mechanism comprised of the piston assembly 38, the friction plates 34 and 36 and the back-up plate 32.

In the above description, the friction torque transmitting device is a brake. However, it will be readily apparent to those skilled in the art that the friction torque transmitting device can also be a clutch by simply providing a rotating housing which includes the cavity 16 instead of a stationary housing.

The valve 54 is effective to prevent the build-up of centrifugal pressures within the cavity 16 whenever the device is used as a clutch. The valve mechanism is equally effective to provide a quick exhaust of either a clutch or brake whenever the engaging fluid pressure is reduced below the pressure required to maintain the valve 54 closed.

The clutch housing 22, as seen in FIG. 1, slidably supports a piston 60. This is a conventional clutch piston arrangement wherein the clutch piston acts through a diaphragm spring member 64 to provide controlled engagement and disengagement of the friction plates incorporated in the clutch assembly.

From the description of the piston assembly 38, it will become apparent to those skilled in the art that the piston 60 can be changed to incorporate the unique advantages of piston assembly 38. That is, the reaction ring portion 50 can be made to react against a lock ring 62 disposed in the clutch housing 22 such that the diaphragm spring 64 is eliminated and the piston 60 would be brought to bear directly on a pressure plate 66.

Also, a ball dump centrifugal valve 68 shown in the piston 60 would be eliminated by the use of an integral valve. Thus, it is evident that the above described piston assembly will reduce the number of parts needed in the construction of friction torque transmitting devices providing for reduced inventory costs and assembly costs through the unique integration of the annular lip seals, valve assembly, return spring and apply ring into a single assembly. This reduces the number of parts which must be handled either during assembly of the piston or during assembly of the friction torque transmitting device. Accordingly, those skilled in the art will appreciate the cost reductions which will accompany the use of the present invention and current mass-produced transmissions.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in a friction torque transmitting device having a piston slidably disposed in a cylinder and being selectively pressurized therein for controlling the engagement of frictional plates; said improvement comprising: a rigid piston body generally U-shaped in cross section; an elastomeric covering portion bonded on said piston body and incorporating therein a pair of lip seal portions for engaging the cylinder and cooperating therewith to form a fluid tight joint; valve means formed in said bonded portion for permitting air bleed from said cylinder; a reaction ring bonded to the elastomeric covering; and a spring portion integral with said elastomeric portion operatively disposed between said piston body and said reaction ring.

2. An improvement in a friction torque transmitting device having a piston slidably disposed in a cylinder and being selectively pressurized therein for controlling the engagement of frictional plates; said improvement comprising: a piston body generally U-shaped in cross section; an elastomeric covering portion bonded on said piston body and incorporating therein a pair of lip seal portions for engaging the cylinder and cooperating therewith to form a fluid tight joint; valve means formed in said bonded portion for permitting air bleed from said cylinder and for preventing engagement due to centrifugal force; an apply ring bonded to the elastomeric covering; and a spring portion bonded integral with said elastomeric portion operatively disposed between said piston body and said apply ring.

* * * * *